(12) United States Patent
Calzetta et al.

(10) Patent No.: US 12,090,789 B2
(45) Date of Patent: Sep. 17, 2024

(54) RUBBER COMPOUNDS FOR PNEUMATIC TYRES COMPRISING RECYCLED CARBON BLACK

(71) Applicant: BRIDGESTONE CORPORATION, Tokyo (JP)

(72) Inventors: Alessandra Calzetta, Rome (IT); Alessandra Bartoloni, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 645 days.

(21) Appl. No.: 16/621,039

(22) PCT Filed: Jun. 28, 2018

(86) PCT No.: PCT/EP2018/067358
§ 371 (c)(1),
(2) Date: Dec. 10, 2019

(87) PCT Pub. No.: WO2019/002437
PCT Pub. Date: Jan. 3, 2019

(65) Prior Publication Data
US 2020/0189318 A1    Jun. 18, 2020

(30) Foreign Application Priority Data
Jun. 29, 2017   (IT) .......................... 102017000073075

(51) Int. Cl.
| | | |
|---|---|---|
| *B60C 1/00* | (2006.01) | |
| *C08F 136/06* | (2006.01) | |
| *C08K 3/04* | (2006.01) | |
| *C08K 3/06* | (2006.01) | |
| *C08K 5/54* | (2006.01) | |
| *C08K 9/04* | (2006.01) | |
| *C08L 7/00* | (2006.01) | |
| *C09C 1/48* | (2006.01) | |
| *C09C 1/56* | (2006.01) | |

(52) U.S. Cl.
CPC .............. *B60C 1/00* (2013.01); *C08F 136/06* (2013.01); *C08K 3/04* (2013.01); *C08K 3/06* (2013.01); *C08K 5/54* (2013.01); *C08K 9/04* (2013.01); *C08L 7/00* (2013.01); *C09C 1/482* (2013.01); *C09C 1/56* (2013.01); *C01P 2006/12* (2013.01); *C08L 2312/02* (2013.01)

(58) Field of Classification Search
CPC ... C08K 9/04; C08K 5/54; C08K 3/06; C08K 5/372; C08K 3/04; C08K 5/175; C08K 5/37; C08F 136/06; C09C 1/482; C09C 1/56; C08L 7/00; C08L 21/00; C08L 2312/02; C08L 9/00; B60C 1/00; C01P 2006/12
See application file for complete search history.

(56) References Cited

U.S. PATENT DOCUMENTS

| | | |
|---|---|---|
| 5,907,009 A | 5/1999 | Muraoka et al. |
| 2016/0280886 A1 | 9/2016 | Cossu et al. |

FOREIGN PATENT DOCUMENTS

| | | |
|---|---|---|
| EP | 3 173 251 A1 | 5/2017 |
| JP | 61-221242 A | 10/1986 |
| JP | 2013-107991 A | 6/2013 |
| WO | 2010/000299 A1 | 1/2010 |

OTHER PUBLICATIONS

English Machine Translation of JP 2013-107991 (Year: 2013).*
International Carbon Black Association (ICBA), "What is Carbon Black?", ICBA website, 2016, 2 pages.
International Search Report of PCT/EP2018/067358 dated Aug. 2, 2018.

* cited by examiner

*Primary Examiner* — Angela C Scott
(74) *Attorney, Agent, or Firm* — Sughrue Mion, PLLC

(57) ABSTRACT

A rubber compound for pneumatic tyres comprising a cross-linkable unsaturated-chain polymer base, carbon black, a silane bonding agent and a vulcanization system. Part of the carbon black is carbon black from pyrolysis having a surface functionalization deriving from a treatment with an amino-acidic compound comprising at least one thiol group or a disulfide group.

5 Claims, No Drawings

RUBBER COMPOUNDS FOR PNEUMATIC TYRES COMPRISING RECYCLED CARBON BLACK

CROSS REFERENCE TO RELATED APPLICATIONS

This application is a National Stage of International Application No. PCT/EP2018/067358 filed Jun. 28, 2018, claiming priority based on Italian Patent Application No. 102017000073075 filed Jun. 29, 2017.

The present invention relates to rubber compounds for pneumatic tyres comprising recycled carbon black wherein the surface thereof has been activated by means of a treatment with an aminoacidic compound having a thiol group or a disulfide group.

The present invention also relates to a recycled carbon black wherein the surface thereof has been activated by means of a treatment with an aminoacidic compound having a thiol group or a disulfide group, and to the usage thereof in rubber compounds for the production of pneumatic tyres.

For ecological reasons the need for a correct disposal and recycling of end-of-life pneumatic tyres has long been felt. To this end solutions have been sought that are capable of recycling at least part of the components thereof. One of the components of an end-of-life pneumatic tyre that is desirable to recover for its subsequent re-use is carbon black, which is considered to be a high-end material.

The recycling of carbon black takes place by means of an end-of-life pneumatic tyre pyrolysis process. Here and in the following description, by "carbon black from pyrolysis" is meant recycled carbon black obtained by the technique of used pneumatic tyre pyrolysis. As is known to a person skilled in the art, the pyrolysis process produces recycled carbon black (carbon black from pyrolysis) that is devoid of functional groups upon the surface thereof (*A comparison of surface morphology and chemistry of pyrolytic carbon blacks with commercial carbon blacks, Powder Technology* 160 (2005) 190-193). One such characteristic of carbon black from pyrolysis inevitably has repercussions regarding the surface activity thereof.

Despite the fact that carbon black from pyrolysis finds application in various sectors, in the field of pneumatic tyres the usage thereof nonetheless presents many problems. In fact, it has been found that carbon black from pyrolysis, for the same surface area, has a reinforcing strength that is lower than that of first use carbon black (here and hereinafter "first use carbon black" refers to non-recycled carbon black). The lower reinforcing strength of carbon black from pyrolysis is due to its reduced surface activity towards the polymer base.

The low surface reactivity of carbon black from pyrolysis is a serious limitation to its usage as a replacement, even partial, for first use carbon black.

In this respect, it has been experimentally proven that even the partial replacement of first use carbon black with carbon black from pyrolysis results in a noticeable deterioration in the mechanical properties of the compound, such as for example the abrasion resistance, tensile strength, the modulus values M % etc.

EP3173251 discloses a rubber compound for tyres comprising a crosslinkable unsaturated-chain polymer base, carbon black, a silane bonding agent and a vulcanization system wherein a portion of the carbon black is recycled carbon black obtained by pyrolysis of tyres and including hydroxyl and/or carboxyl groups on the surface thereof.

As can be immediately shown, the possibility of utilizing carbon black from pyrolysis in the preparation of compounds for pneumatic tyres would pose a great advantage both in ecological and economic terms.

The Applicant has implemented a solution whereby it is possible to prepare rubber compounds for pneumatic tyres wherein part of the first use carbon black is substituted by carbon black from pyrolysis without incurring the disadvantages of the prior art and, therefore, without reflecting any deterioration as regards the mechanical properties of the compound itself.

The object of the present invention is a rubber compound for pneumatic tyres comprising a cross-linkable unsaturated-chain polymer base, carbon black, a silane bonding agent and a vulcanization system; said compound being characterized in that part of said carbon black is carbon black from pyrolysis having a surface functionalization deriving from a treatment with an aminoacidic compound comprising at least one thiol group or a disulfide group.

Here and hereinafter, vulcanization system refers to a complex of ingredients comprising at least sulfur and accelerating compounds, that in the preparation of the compound are added in a final mixing stage and have the purpose of promoting the vulcanization of the polymer base once the compound is subjected to a vulcanization temperature.

Here and hereinafter, the term "cross-linkable unsaturated-chain polymer base" refers to any natural or synthetic non-cross-linked polymer capable of assuming all of the chemical-physical and mechanical characteristics typically assumed by elastomers after cross-linking (vulcanization) with sulfur-based systems.

Preferably, the aminoacidic compound having a thiol group is $HSCH_2CHNH_2COOH$ (cysteine) or the aminoacidic compound having a disulfide group is $(SCH_2CHNH_2COOH)_2$ (cystine).

Cystine being the oxidized form of cysteine.

When cysteine is added to a mixture it rapidly converts/reduces to the other form, cystine.

Preferably, said carbon from pyrolysis has a surface functionalization of between 5 and 15% by weight.

The functionalization is determined by means of a CHNS elemental analysis, whilst by means of a TGA analysis it is possible to determine the composition of the material.

Preferably, said carbon black from pyrolysis is present within the compound in an amount of between 2 and 25% in phr of the total carbon black. Total carbon black refers to the sum of the first use carbon black and the carbon black from pyrolysis.

Another object of the present invention is a pneumatic tyre portion being made with the compound of the present invention. Preferably, said pneumatic tyre portion is a portion of the casing of the pneumatic tyre.

Another object of the present invention is the carbon black from pyrolysis, wherein the surface thereof has been activated by means of a treatment with an aminoacidic compound having a thiol group or a disulfide group.

Another object of the present invention is the use within rubber compounds for the production of pneumatic tyres of carbon black from pyrolysis wherein the surface thereof has been activated by means of a treatment with an aminoacidic compound having a thiol group or a disulfide group.

For a better understanding of the invention, the following examples are for illustrative and non-limiting purposes.

EXAMPLES

Two comparison compounds (A and B) and a compound according to the present invention (C) were prepared. The three example compounds have a composition that is typical of the shoulder portion of a pneumatic tyre. Such a characteristic is not limiting, insofar as the present invention can also be applied to compounds in relation to other portions of a pneumatic tyre, with a preference to those compounds that relate to the casing.

The first comparison compound (A) as a filler comprises first use carbon black.

The second comparison compound (B) differs from the first comparison compound (A) in that part of the first use carbon black has been substituted by carbon black from pyrolysis without, however, this having been subjected to any surface activation treatment.

By surface activation treatment is meant a procedure wherein the carbon black from pyrolysis is treated by the aminoacid allowing the modification of the surface properties without altering the bulk characteristics.

The compound according to the invention (C) differs from the first comparison compound (A) in that part of the first use carbon black has been substituted by carbon black from pyrolysis which has previously been subjected to the surface activation treatment according to the present invention.

In the description that follows, "untreated carbon black from pyrolysis" refers to a recycled carbon black, obtained from a pneumatic tyre pyrolysis process but not subjected to an activation treatment according to the present invention; whilst, "treated carbon black from pyrolysis" refers to a recycled carbon black obtained from a pneumatic tyre pyrolysis process and subjected to a treatment according to the present invention.

All of the example compounds include the same amount in phr of total carbon black (first use carbon black+carbon black from pyrolysis).

The example compounds were obtained according to the procedure below:

Preparation of the Compounds
(1$^{st}$ Mixing Step)

Before the start of the mixing, a mixer with tangential rotors and with an internal volume of 2 liters was loaded with the cross-linkable polymer base, the first use carbon black, the carbon black from pyrolysis (where required) reaching a fill factor of between 66-72%.

The mixer was operated at a speed of between 40-60 revolutions/minute, and the mixture thus formed was discharged once a temperature of between 140-160° C. had been reached.

(2$^{nd}$ Mixing Step)

The mixture obtained from the previous step was reworked in a mixer that was operated at a speed of between 40-60 revolutions/minute and, thereafter, discharged once a temperature of between 130-150° C. had been reached.

(Final Mixing Step)

Sulfur, the vulcanization agents and antioxidants were added to the mixture obtained from the previous step, the reaching a fill factor of between 63-67%.

The mixer was operated at a speed of between 20-40 revolutions/minute, and the mixture thus formed was discharged once a temperature of between 100-110° C. had been reached.

Table I shows the compositions in phr of the three compounds.

TABLE I

|  | A | B | C |
| --- | --- | --- | --- |
| NR | 50 | 50 | 50 |
| BR | 50 | 50 | 50 |
| First use carbon black | 70 | 55 | 55 |
| Untreated carbon black from pyrolysis | — | 15 | — |
| Treated carbon black from pyrolysis | — | — | 15 |
| Sulfur | 1.4 | 1.4 | 1.4 |
| Vulcanization accelerants | 10 | 10 | 10 |
| Antioxidants | 5.1 | 5.1 | 5.1 |

NR is a 1,4-cis-polyisoprene rubber of natural origin.

BR is a butadiene rubber with a 1,4-cis content of at least 40%.

The first use carbon black is classified under the abbreviation N330.

The untreated carbon black from pyrolysis is derived from carbon black obtained by the end-of-life pneumatic tyre pyrolysis process and has a surface area in the range 30-80 m$^2$/g.

The treated carbon black from pyrolysis is derived from the untreated carbon black from pyrolysis that has been subjected to an oxidation process as reported below.

The antioxidant is trimethylquinoline (TMQ).

The accelerant is N-tert-butyl-2-benzothiazyl sulfenamide (TBBS).

The procedure utilized for the surface activation of the carbon black from pyrolysis is given below as an example.

An aqueous solution of 10% w/w Cysteine was kept under agitation at 200 rpm for 4 hours at ambient temperature.

To the above aqueous solution carbon black from pyrolysis was added after the same had been kept in an oven at 120° C. for a period of time equal to 24 hours. The weight ratio between the Cysteine and the carbon black from pyrolysis was 4/1. The resulting solution was left under agitation for 72 hours at ambient temperature. Once the 72 hours had elapsed, the solution was filtered on filter paper, which was subsequently washed with water until no quantity of free cysteine resulted from the analyses of the water used for washing by means of spectroscopy and chromatography techniques.

The filtrate was subsequently recovered and placed in an oven for 72 hours as 120° C. before being characterized for its composition.

It was determined that the carbon black from pyrolysis, functionalized as described above, has a degree of functionalization equal to 8.5%.

From the compounds listed in Table I respective samples were derived which were subjected to tests with regard to the mechanical properties thereof in order to verify the advantages obtained from the use of carbon black from pyrolysis treated according to the invention.

In particular, properties relating to the tensile strength, modulus at 300% and resistance to crack propagation were evaluated.

The mechanical properties were measured in accordance with the ASTM D412C standard.

Furthermore, a parameter referred to as "BOUND RUBBER" was measured as chemical-physical polymer-filler interaction indicator; the test is performed on non-vulcanized samples determining the fraction of compound that is not solubilized after a treatment in THF for 24 hours at room temperature.

The results obtained from the tests above are given in Table II in indexed form with respect to the results obtained with compound A.

TABLE II

|  | A | B | C |
|---|---|---|---|
| Tensile strength | 100 | 85 | 100 |
| Modulus at 300% | 100 | 80 | 100 |
| Resistance to crack propagation | 100 | 90 | 100 |
| Bound rubber | 100 | 85 | 100 |

It is clear from the results reported in Table II that the compound obtained according to the dictates of the present invention (the use of the treated carbon black from pyrolysis) is able to recover the disadvantages due to the partial substitution of the first use carbon black with the carbon black from pyrolysis.

Indeed, the comparison between the data in relation to compound B and those in relation to compound C demonstrates how the functionalization of the carbon black from pyrolysis according to the invention is capable of activating the surface of the carbon black from pyrolysis towards the polymer base in such a way as to restore the reinforcing strength of the first use carbon black.

The invention, that is the object of the present invention, provides an opportunity to utilize carbon black from pyrolysis without compromising the mechanical properties of the compound.

As is immediately revealed, the possibility offered by the present invention involves a major advantage in ecological terms. In fact, thanks to the present invention, it will be possible to utilize carbon black derived from end-of-life pneumatic tyres in order to prepare new pneumatic tyres.

Finally, despite the fact that the surface activation treatment of carbon black from pyrolysis necessarily implies an additional expense, the possibility however of utilizing carbon black from pyrolysis, even if properly treated, as a substitute for part of the first use carbon black, still represents an economic advantage.

The invention claimed is:

1. Rubber compound for pneumatic tyres consisting of a cross-linkable unsaturated-chain polymer base, carbon black, wherein a part of said carbon black is recycled carbon black having a surface functionalization, a silane bonding agent, a vulcanization system, and optionally an antioxidant;
    said compound being characterized in that said recycled carbon black is obtained from the pyrolysis of used pneumatic tyres, and wherein said recycled carbon black has a surface functionalization derived from treatment of the recycled carbon black with an aminoacidic compound comprising at least one thiol group or a disulfide group, and said recycled carbon black has surface functionalization of between 5 and 15% by weight.

2. Rubber compound for pneumatic tyres according to claim 1, characterized in that the aminoacidic compound is $HSCH_2CHNH_2COOH$ or $(SCH_2CHNH_2COOH)_2$.

3. Rubber compound for pneumatic tyres according to claim 1, characterized in that said recycled carbon black is present in the compound in a quantity of between 2 and 25% in phr of the total carbon black.

4. Portion of pneumatic tyre made with the rubber compound according to claim 1.

5. Portion of pneumatic tyre according to claim 4, characterized in that it is a portion of the casing of the pneumatic tyre.

* * * * *